Dec. 29, 1936.　　　　　N. P. BILLING　　　　2,065,993
CAMERA LENS AND CAMERA
Filed April 6, 1935　　　　3 Sheets-Sheet 1
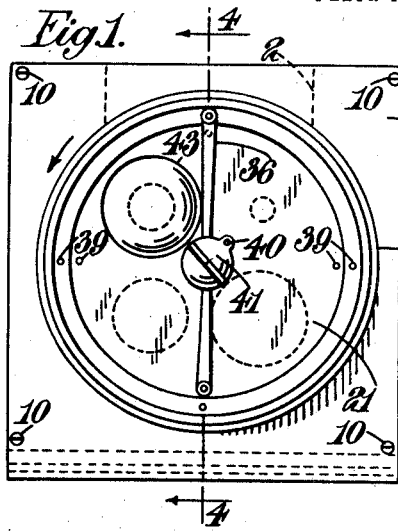
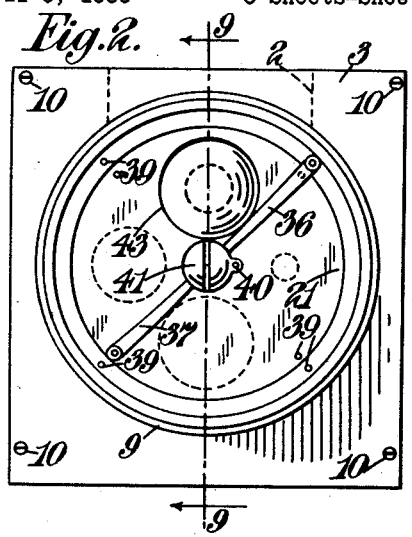
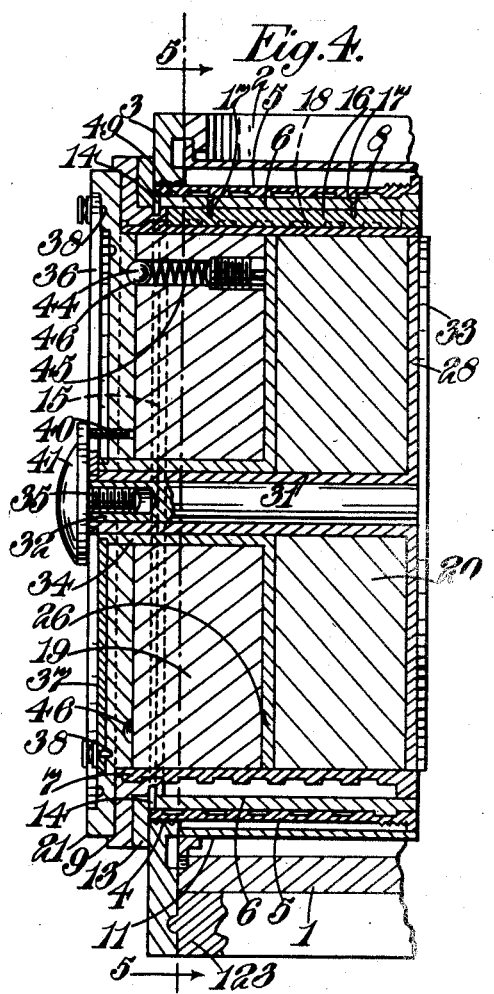
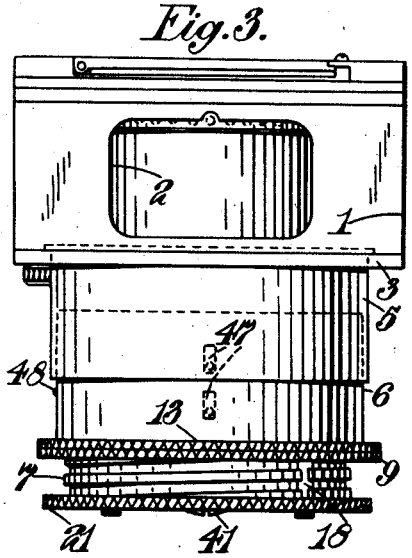
INVENTOR
Noel Pemberton Billing
by his attorneys
Byrnes Stebbins & Blenko Dec. 29, 1936.  N. P. BILLING  2,065,993
CAMERA LENS AND CAMERA
Filed April 6, 1935   3 Sheets-Sheet 2
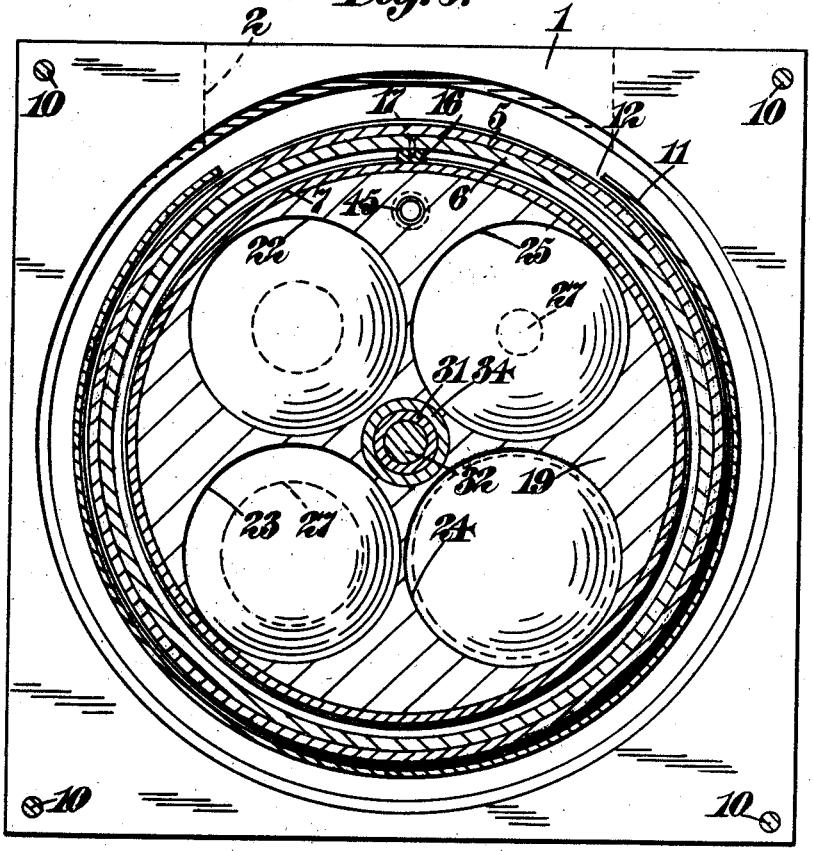
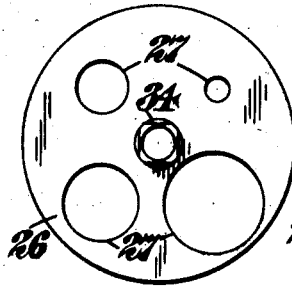 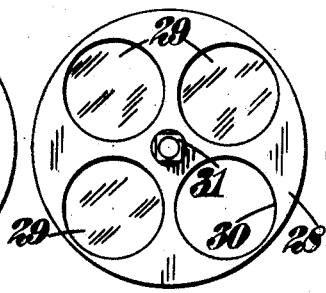 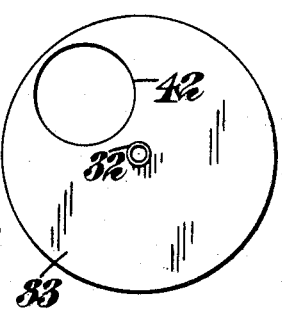
INVENTOR
Noel Pemberton Billing
by his attys

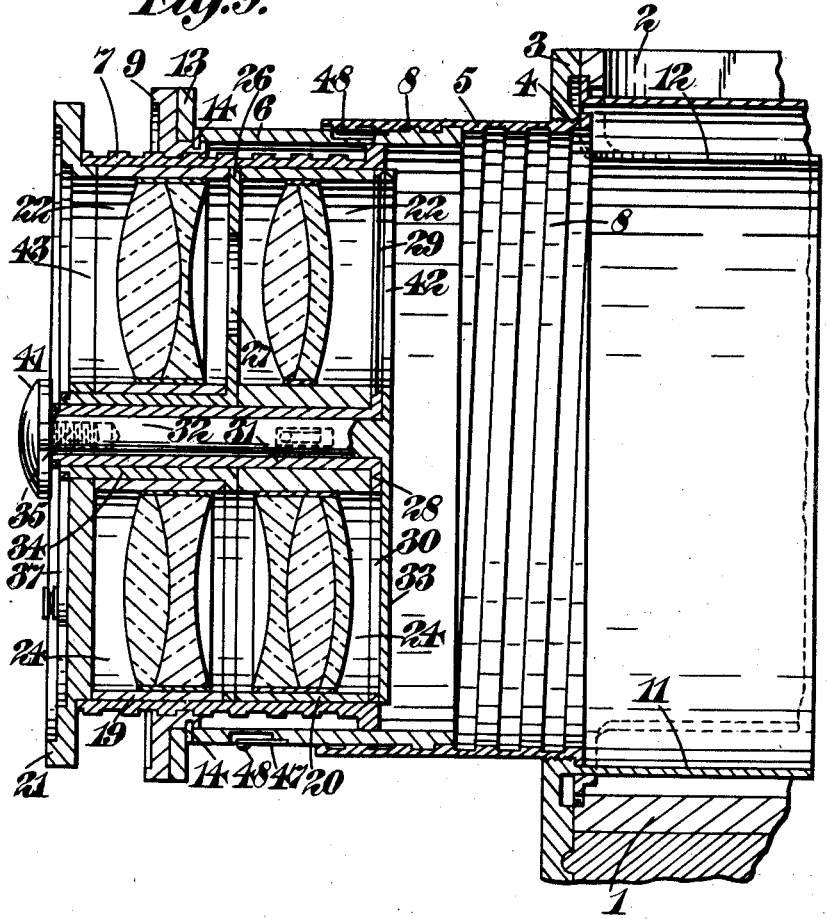

Patented Dec. 29, 1936

2,065,993

UNITED STATES PATENT OFFICE 2,065,993

CAMERA LENS AND CAMERA

Noel Pemberton Billing, London, England

Application April 6, 1935, Serial No. 15,119
In Great Britain April 6, 1934

13 Claims.  (Cl. 95—45)

This invention consists of improvements in or relating to camera lenses and to cameras. It has for one of its objects to provide a novel construction whereby one or two different lenses or lens combinations can be employed optionally in a single camera with simplicity and without undue bulk.

The present invention comprises in or for a camera the combination of a lens carrier, a plurality of lenses mounted therein and a mount for securing the carrier to the camera body, which mount provides means to adjust the lenses individually into register with the optical axis of the camera and also longitudinally of that axis to positions appropriate to their focal lengths. The lens carrier for this purpose may be rotatable in the mount and adjustable longitudinally of the axis thereof.

In one form of the invention a single focussing attachment is provided whereby the lens carrier can be accurately focussed for any lens that is brought into use.

In order that the invention may be more clearly understood a preferred example of the invention will now be described in detail with the aid of the accompanying drawings, in which—

Figure 1 is a front elevation of the camera in its closed position,

Figure 2 is a view similar to Figure 1 showing the front plate in position for exposure, and is an elevation of the parts shown in Figure 3, Figure 3 is a plan view on the same scale as Figure 2 of the parts shown in the latter figure, Figure 4 is a section on an enlarged scale on the line 4—4 of Figure 1, looking in the direction of the arrows, Figure 5 is a section on the line 5—5 of Figure 4, looking in the direction of the arrows, Figure 6 is a detail view of a stop disc employed in the camera, Figure 7 is a similar detail view of a filter-carrying disc, Figure 8 is a detail view of a back plate for the lens-carrying unit, Figure 9 is a view similar to Figure 4 of the various parts extended for use, and is a section on the line 9—9 of Figure 2 looking in the direction of the arrows.

Like reference numerals indicate like parts in the several figures of the drawings.

Referring particularly to Figures 1, 4, and 9, the outer case 1 of the camera is of rectangular form and has in its upper wall a rectangular aperture 2. The front of the case has secured to it a plate 3 furnished with a circular aperture, the periphery of which is screwthreaded at 4 to engage with corresponding screwthreads at the end of an outer tubular member 5 comprising part of the lens-carrying unit.

This unit comprises three main portions, namely, the outer tubular member 5, an intermediate tubular member 6, and an inner tubular member 7. The members 5 and 6 are interengaged by means of rectangular sectioned screwthreads 8 and a similar screwthread is formed on the outer surface of the member 7 and this is engaged with corresponding threads on the inner surface of a focussing ring 9.

The plate 3 is secured to the body of the outer casing 1 by means of screws 10 and integral with the plate 3 is an open-ended drum 11 having at one portion of its periphery an aperture 12 corresponding substantially in shape and dimensions with the aperture 2 provided in the casing 1. The apertures 2 and 12 serve for reflex viewing, in any preferred manner, of the object to be photographed.

The ring 9 is held in position against a flange 13 of the member 6 by means of pins 14 which are secured to and extend within the member 6 and enter a groove 15 provided in a portion of the ring 9 that is of cylindrical form having an axis parallel to that of the elements 5, 6 and 7, all of which are coaxial.

The part 7 constitutes the lens-carrier proper and can, for focussing purposes, be moved axially relatively to the part 6 by rotation of the ring 9. Relative rotation between the parts 6 and 7 is prevented by means of a key 16 secured by screws 17 to the part 6 and a co-operating keyway 18 (Figure 4) cut into the surface of the upstanding threads of the part 7.

Within the screwthreaded member 7 are two coaxial cylindrical blocks 19 and 20 and in front of the block 19 there is a flanged front cover plate 21. The blocks 19 and 20 have four equidistantly spaced and registering throughway apertures 22, 23, 24, and 25 and in each aperture there is secured a lens element or combination lens element so that the registering pairs of lens elements constitute respective front and back elements of a combination lens. In other words, the two elements in the apertures 22 constitute a single lens and so on.

Situated between the parts 19 and 20 is a disc 26 formed with a number of different sized apertures 27 as in Figure 6 to provide stops of different value which can be turned into effective positions in the manner to be described later. Behind the part 20 is another disc 28 formed as shown in Figure 7 with a plurality of apertures in which are inserted colour filters 29. One operture may be left devoid of a colour filter as at 30.

The disc 28 is integral with a sleeve 31 which is rotatable upon a spindle 32 coaxial with the lens-carrier and extending through the latter from a back plate 33. The disc 26 is integral with a sleeve 34 which is rotatable on the sleeve 31 and the back and front plates are held together by means of a large-headed screwed stud 35 which takes into the end of the spindle 32 when the parts have been assembled in the order and positions shown. A grub screw 40 connects the head 41 of the stud 35 to the front cover plate 21 so that the front and back plates 21 and 33 and the spindle 32 can be rotated together relatively to the part 7. The back cover plate 33 is formed with a single aperture 42 which is coaxial with a single aperture 43 in the front cover plate 21. In order to locate the front plate 21 and its associated parts in desired angular positions of adjustment a ball plunger 44 pressed outwardly by a spring 45 and retained within a tubular recess formed in the block 19 co-operates with recesses 46 formed on the inner surface of the front plate 21. The positions of the recesses are so disposed that each time the ball plunger 44 clicks into a recess one or the other of the combination lenses will be in the position for use which in practice is the uppermost position shown in Figure 2.

The parts 19 and 20 will be made either as a very tight push fit in the part 7 or will be secured therein so as to prevent relative rotation between those parts.

Mounted by means of square ends on the sleeves 31 and 34 are manipulating arms or pointers 36 and 37 respectively which are of springy material normally tending to press their outer ends against the surface of the front cover plate 21. Inwardly projecting from each of the arms are pins 38 which can be engaged within locating holes 39 in the front cover plate so as to ensure that the selected one of the stops and/or of the filters will be in correct relation with the lens selected for use.

It will be appreciated that with the part 5 screwed out in the position shown in Figure 9 the part 6 can be turned so as to bring one or the other of the combination lenses into the uppermost or operative position. As the lenses will have different focal lengths the adjustment of their positions along the axis of the camera relatively to the focal plane thereof can be adjusted by turning the member 6, but in order to locate each lens in its proper position there is secured to the part 6 a plurality of spring detents 47 each furnished with a pip 48 to engage in a recess 49 (Figure 4) in the member 5. The positions of the pips 48, which are spaced apart both angularly and axially with regard to the part 6, and are so chosen that one or the other will engage within the recess 49 when the appropriate lens has been brought into the upper operative position. A lens is in its operative position when it lies behind the aperture 43 and the latter is in the topmost position shown in Figure 2.

The camera will be used in the following manner:—

The parts can be telescoped partly by sliding and partly by screwing as will be understood into the closed position shown in Figures 2 and 4 when the camera is not required for use. In order to bring the parts into operative position the tubular member 5 is first drawn out until its screw-threads 4 are in engagement with the corresponding threads on the front plate 3, whereafter it is screwed out to the limit and is thus locked in its extended position. The desired lens is then brought into the required position by gripping rings 9 and 13 simultaneously and turning the tubular member 6 until the detent 48 corresponding to the selective lens has clicked into position. A fine focussing can then be effected by turning ring 9 alone. The focal plane of the camera will be situated towards the rear of the camera body, at right angles to the axis of the lens, and the centre of the exposure surface will be situated coincident with the axis of the lens which is in the operative position indicated in Figure 2.

After each lens has been brought into the operative position, the cover plate 21 must be turned to bring its aperture 43 into coincidence with the operative lens.

It will be observed that having once set the stops and filters relatively to the front plate 21 as the latter must be turned to bring its aperture in line with the top lens, whichever one of the lenses is selected for use, the same stops and filters will always be brought into position until a re-selection of the stops and filters is to be made. Consequently if given identical conditions exposures may be made through the different lenses with identical stops and filters without any readjustment of the latter.

The camera is conveniently provided with a slide 123 which can be moved endwise in guides provided in the front and back plates and which can be secured to any suitable supporting device on which it is desired to mount the camera in position for use.

It will be understood that the combination lens and its mounting within the camera may be employed in a camera of any preferred form.

In a modification of the invention the carriers for the front and rear lens elements may be relatively angularly adjustable so that different lens combinations may be obtained other than the four main combinations illustrated.

I claim:

1. For use with a photographic camera body, the combination of a rotatable tubular lens carrier adjustably mounted for movement into and out from a position at which the carrier is collapsed at least mainly within the camera body, and a plurality of camera lenses mounted in the carrier for individual adjustment to a position of use by rotation of the lens carrier and by movement of the latter out from the collapsed position.

2. For use with a photographic camera body, the combination of a tubular lens carrier constituting the front closure element of the camera body and adjustably mounted for angular and axial movement relatively thereto, and a plurality of camera lenses mounted in the carrier for individual adjustment to a position of use by movement of the carrier.

3. For use with a photographic camera body, the combination of a tubular mount telescopically carried by the camera body, a tubular lens carrier which is slidingly received within the mount and is rotatable relatively to the camera body, and a plurality of camera lenses mounted in the carrier for individual adjustment to a position of use by rotational and sliding movement of the carrier.

4. For use with a photographic camera body, the combination of a rotatably mounted tubular lens carrier constituting the front closure element of the camera body, a plurality of camera lenses mounted in the carrier for individual adjustment to a position of use by rotation of the carrier, and focusing means in engagement with the carrier externally thereof to move the latter bodily.

5. For use with a photographic camera body, the combination according to claim 3 in which the tubular mount is carried so as to be rotatable relatively to the camera body and in which the lens carrier is received within the mount to be axially adjustable but non-rotatable therein and is combined with a ring rotatably supported by the mount and in screw-threaded engagement with the external surface of the tubular lens carrier.

6. For use with a photographic camera body, the combination of a tubular mount telescopically carried by the camera body, a tubular lens carrier slidingly and non-rotatably received within the tubular mount, a plurality of camera lenses mounted in the carrier in angularly spaced relation with their optical axes parallel to the axis of the carrier for individual adjustment to a position of use by movement of the mount and the carrier, adjusting means to move the carrier axially within the mount, and means to adjust and lock the mount into predetermined positions of extension and angular adjustment corresponding to the lens to be used.

7. For use with a photographic camera body, the combination according to claim 6 in which the tubular mount constitutes one element of a collapsible telescopic camera body and in which the tubular lens carrier and lenses carried thereby constitute a front closure element for the camera body.

8. For use with a photographic camera body, the combination according to claim 1 in which each camera lens comprises front and back lens elements and in which the front elements are mounted in the lens carrier for rotation therewith and for individual adjustment by such rotation to a position of use.

9. For use with a photographic camera body, the combination according to claim 2 comprising in addition, a plate located at one end of the tubular lens carrier and having an aperture for registration with the optical axis of the camera and the camera lens to be employed.

10. For use with a photographic camera body, the combination according to claim 1 in which at least one auxiliary device for varying the nature and quantity of light passing through the lens in use is also mounted in the tubular lens carrier to be adjustable relatively to the lens in position for use.

11. For use with a photographic camera body, the combination according to claim 1 in which each camera lens comprises front and back lens elements supported near opposite ends of the carrier, and in which at least one auxiliary device for varying the nature and quantity of light passing through the lens in use is mounted in the tubular lens carrier in the space between the lens combinations for adjustment independently of and relatively to the lenses and lens in position for use.

12. For use with a photographic camera body, the combination according to claim 2 in which each camera lens comprises front and back lens elements supported near opposite ends of the carrier and at least one auxiliary device for varying the nature and quantity of light passing through the lens in use is rotatably mounted in the tubular lens carrier in the space between the lens combinations for adjustment independently of and relatively to the lenses and lens in position for use, and in which a support for the auxiliary device comprises a spindle which is rotatable independently of and also together with the device and which is integrally formed with a plate located at one end of the lens carrier and having an aperture for registration with the optical axis of the camera.

13. For use with a photographic camera body, the combination according to claim 6 in which the tubular mount constitutes one element of a collapsible telescopic camera body and in which the tubular lens carrier constitutes a front closure element for the camera body and is provided in combination with front and back lens elements for each camera lens supported near opposite ends of the carrier, at least one auxiliary device for varying the nature and quantity of light passing through the lens in use located in the space between the lens combinations, a central spindle to carry the auxiliary device coaxially with the lens carrier, an end plate at one end of the lens carrier formed to be rigid with the spindle and having an aperture to register with the optical axis of the camera, and means located externally of the plate to adjust the auxiliary device, if desired, independently of any adjustment of the end plate.

NOEL PEMBERTON BILLING.